Dec. 15, 1959　　　E. E. BARKSTROM　　　2,917,021
APPARATUS FOR COATING AND FOR REMOVING
EXCESS COATING MATERIAL FROM ARTICLES
Filed Oct. 8, 1956　　　　　　　　　　　　3 Sheets-Sheet 1

INVENTOR
E. E. BARKSTROM
BY C. A. Hamilton
ATTORNEY

Dec. 15, 1959 E. E. BARKSTROM 2,917,021
APPARATUS FOR COATING AND FOR REMOVING
EXCESS COATING MATERIAL FROM ARTICLES
Filed Oct. 8, 1956 3 Sheets-Sheet 3

INVENTOR
E.E. BARKSTROM
BY C.B. Hamilton
ATTORNEY

2,917,021

APPARATUS FOR COATING AND FOR REMOVING EXCESS COATING MATERIAL FROM ARTICLES

Elmer E. Barkstrom, Chicago, Ill., assignor to Western Electric Company, Incorporated, New York, N.Y., a corporation of New York Application October 8, 1956, Serial No. 614,552

6 Claims. (Cl. 118—57)

This invention relates to apparatus for coating and for removing excess coating material from articles, and more particularly to an apparatus for uniformly coating articles that are indexed along a carrier.

In the present invention, the disclosed apparatus is designed to apply a uniform coating of solder to parts known as wire spring relay combs, which consist of a plurality of laterally-spaced wires held in position by a pair of phenolic blocks, but it will be manifest from the following description that the invention is equally applicable to various coatings of other types of articles.

In the manufacture of telephone switching systems and other telephone apparatus utilizing wire spring relays, it is necessary that wire leads be soldered to the terminal extremities of the individual wires in the relay. As is well known in the art, it is desirable to solder coat the articles to be connected, prior to establishing the physical connections by soldering, to insure ease and rapidity of the soldering operation. This operation is commonly referred to as "tinning," although the coating material is more frequently a solder composition rather than pure tin. The customary procedure is to first dip the articles to be "tinned" into a molten flux to remove any oxidized material, and then immediately plunge the articles into a molten solder bath. The solder coating which adheres to the articles provides protection against further oxidation of the articles and permits ready establishment of soldered connections.

Prior to this invention it was necessary to "tin" articles of this type by manually dipping them into flux and then into molten solder. Then, the person performing the "tinning" operation would manually shake the article before the solder had solidified to remove the excess solder. Manifestly, time-consuming operations of this type are completely impractical as steps in a complete manufacturing process in which the other operations are quickly and accurately performed by means of automatic machines.

It is therefore a principal object of this invention to provide a novel apparatus for rapidly coating articles and removing excess coating material.

It is another object of this invention to provide a coating apparatus capable of operating in synchronization with an automatic feed device which is carrying articles to be coated past the coating apparatus.

It is a further object of this invention to provide an apparatus which will coat an article and thereafter vibrate the article to remove excess coating material.

With these and other objects in view, the present invention contemplates a common drive mechanism for operating a coating apparatus in conjunction with a work piece feed mechanism to successively coat work pieces. Upon presentation of each work piece to the coating apparatus, the drive mechanism operates a work holding mechanism to grip and move the work piece to be coated into a pool of coating material. As the work holding mechanism withdraws the work piece, the drive mechanism actuates a work vibrating means to vibrate the work piece and thereby dislodge excess coating material. Thereafter, the drive mechanism causes the work holding mechanism to release the work piece and again actuate the feed mechanism to present a new work piece to the coating apparatus.

Other objects, advantages, and features of the invention will become apparent upon consideration of the following detailed description in conjunction with the accompanying drawings wherein.

Figure 1:
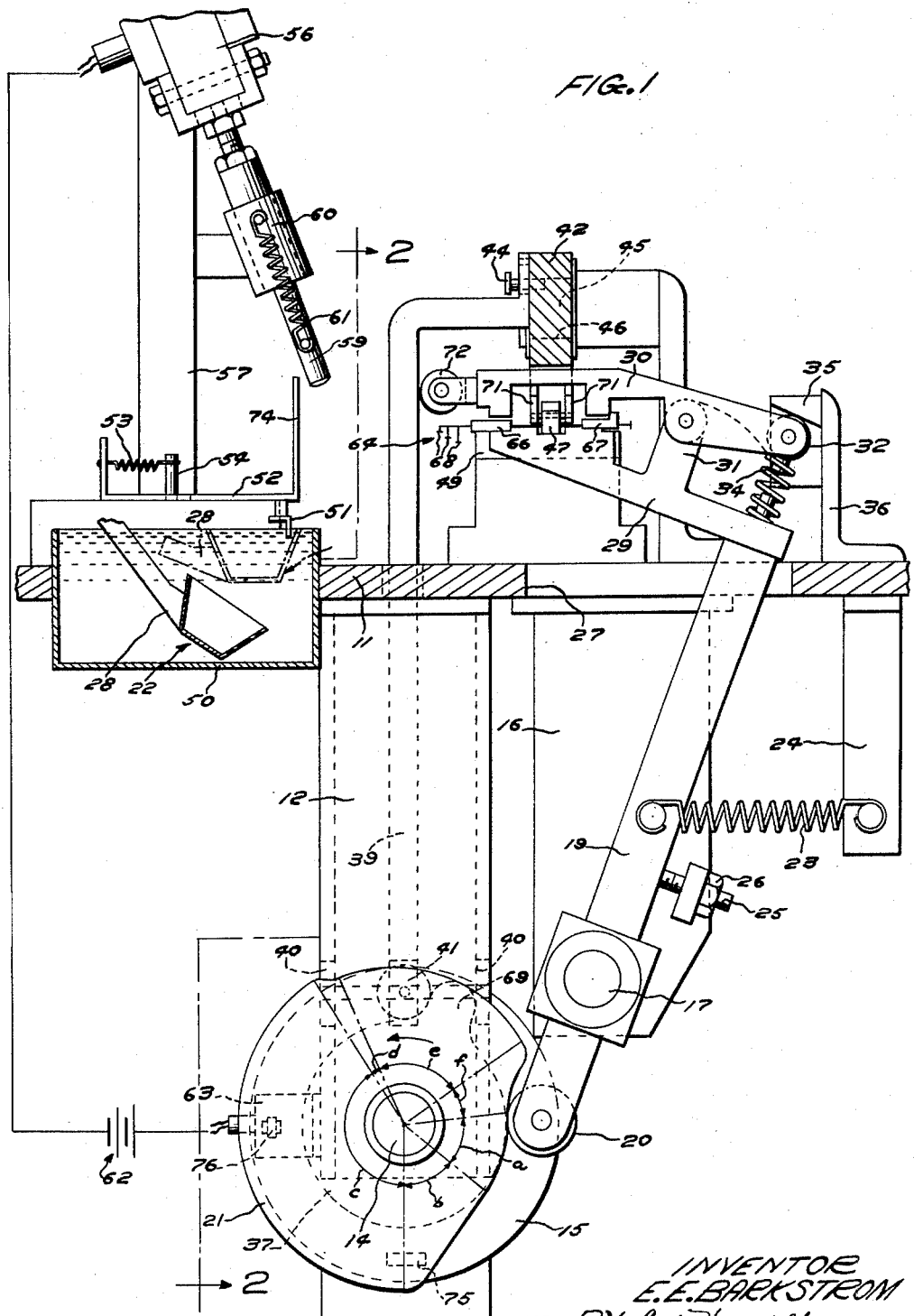
Fig. 1 is a side-elevation view, partially in section, illustrating a coating apparatus embodying the principal features of the invention.
Figure 2:
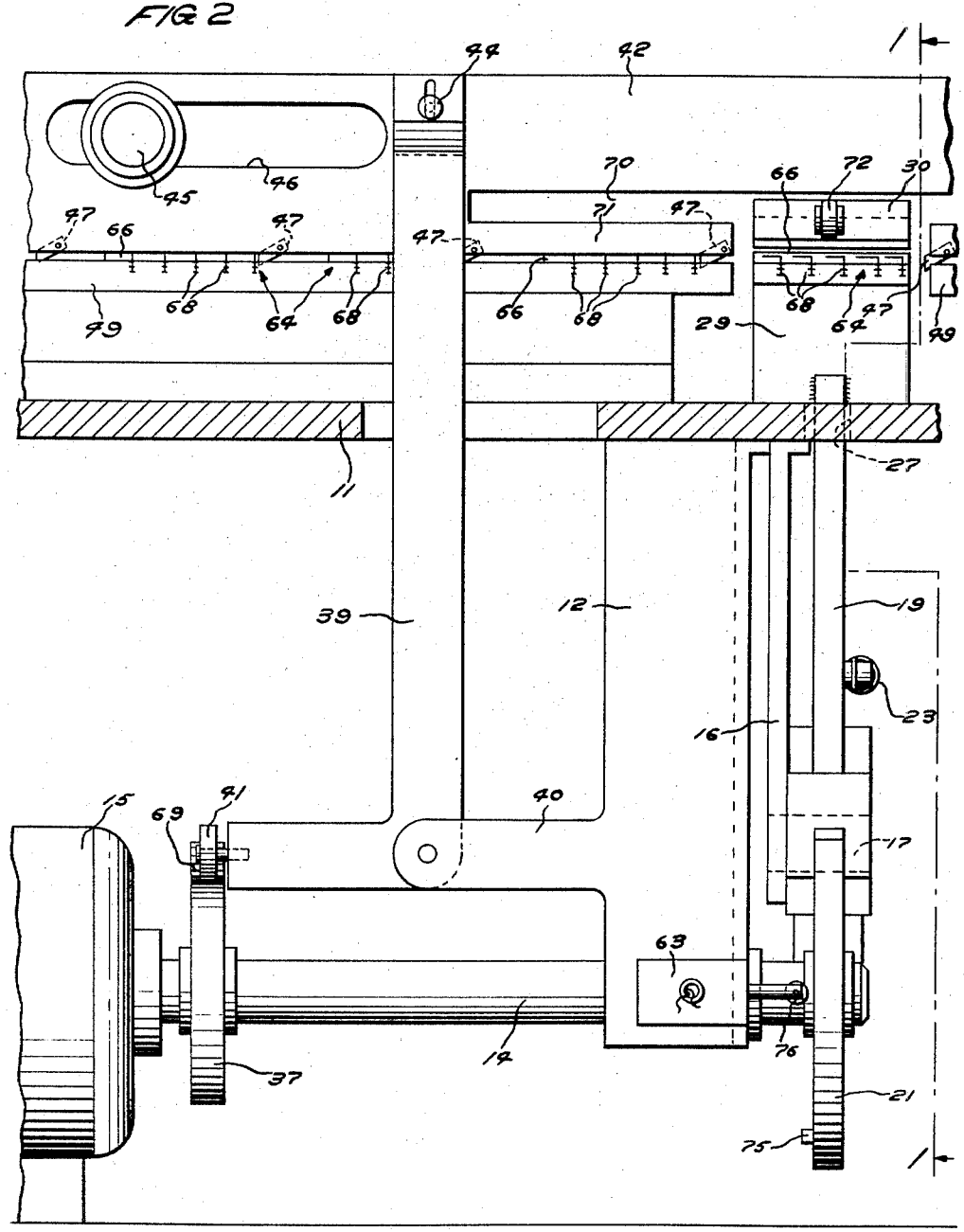
Fig. 2 is a sectional view taken along the line 2—2 of Fig. 1.
Figure 3:
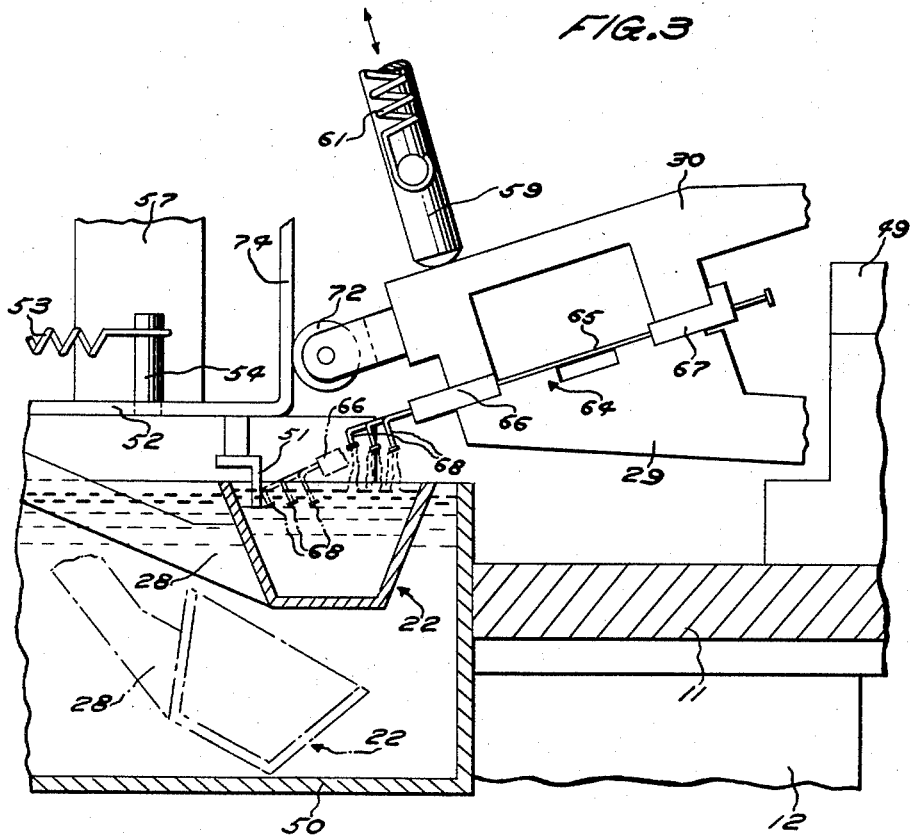
Fig. 3 is an enlarged fragmentary view of Fig. 1 showing the work holding means in the work vibrating position.

Attention now is directed to Figs. 1, 2 and 3 of the drawings wherein like figures of reference designate like parts throughout the several views, and wherein is disclosed an elevated base or support 11 provided with a depending, channeled, shaft support 12. Rotatably supported by the shaft support 12 is a power shaft 14 of a continuous driving means 15 such as an electric motor or the like.

Depending from the base 11 is a support bracket 16 with a pivot pin 17 secured thereto. A rocker arm 19 is pivotally mounted on the pivot pin 17 and has a cam follower 20 rotatably mounted on a first extremity thereof. The cam follower 20 is in rolling contact with a dipping cam 21 rigidly secured to the shaft 14 and is maintained in contact by the resilient urging of a tension spring 23, which is secured to the rocker arm 19 and to a spring bracket 24 depending from the base 11. The support bracket 16 is further provided with a set screw 25 and lock nut 26 which serve to limit the clockwise rotation (Fig. 1) of the rocker arm 19.

The second extremity of rocker arm 19 projects through a slot 27 in the base 11 and has a clamping jaw 29 fixed thereto. A movable clamping jaw 30 is pivotally mounted on a projection 31 on the fixed jaw 29 and carries a cam follower 32 on the rearward extremity thereof. A compression spring 34 is interposed between the rearward extremities of the fixed and movable jaws 29, 30 and normally urges the forward extremity of jaw 30 toward the forward extremity of jaw 29 and into the work piece clamping position. A jaw opening cam 35 is supported above the base 11 by a bracket 36 and is adapted to engage and depress the cam follower 32 against the urging of compression spring 34 when the rocker arm 19 has rotated to its extreme clockwise position (Fig. 1) and thereby move the jaw 30 to an open or work piece releasing position as shown in Fig. 1.

A work feeding cam 37 is keyed to the shaft 14. A bell crank 39 (Fig. 2) is rotatably mounted between projections 40 extending from the shaft support 12 and is provided with a cam follower 41 on a first extremity thereof in rolling contact with the feeding cam 37. The other extremity of the bell crank 39 is attached to a feed bar 42 by means of a pin 44 positioned in a slot in the bell crank extremity and secured to the feed bar 42. The feed bar 42 is supported for reciprocatory motion by means of guide pins 45 (only one shown) in slots 46. Feed bar 42 is further provided with a plurality of pivotally mounted feed pawls 47 which are resiliently urged counterclockwise (Fig. 2) by means of light compression springs (not shown). A feed track 49 is mounted on the base 11 directly beneath the feed bar 42 and is adapted to support work pieces during and between feeding movements of the feed bar 42.

Secured within an aperture in the base 11 is a solder crucible 50 (Figs. 1 and 3). The crucible 50 is provided with a dross scraper 51 which depends from a reciprocable scraper slide 52. A tension spring 53 secured to a fixed spring post 54 and to the scraper slide 52 normally urges the scraper slide to the right as illustrated in Fig. 1. A dipper 22 carried by a pivoted dipper arm 28 is disposed within the solder crucible 50 for cyclic movement from a lower submerged position, as shown by dotted lines in Fig. 3, to a raised position, as indicated by solid lines. The cyclic movements of the dipper 22 are accomplished in timed relationship with the movements of the rest of the apparatus by a suitable mechanism such as that disclosed and claimed in the copending application of Matson et al., Serial No. 465,278, filed October 28, 1954, now Patent No. 2,857,878. The use of such a mechanism provides a constant level reservoir and thus insures that all work pieces will be dipped to a uniform depth.

A solenoid 56 is supported above the solder crucible 50 by means of a standard 57 secured to the base 11. A plunger 59 secured to the solenoid armature is slidably supported by a fixed bushing 60 and is normally urged to its retracted position by a tension spring 61. The solenoid 56 is electrically connected to a source of potential 62 and a normally open micro-switch 63 mounted on the shaft support 12.

Figure 4:
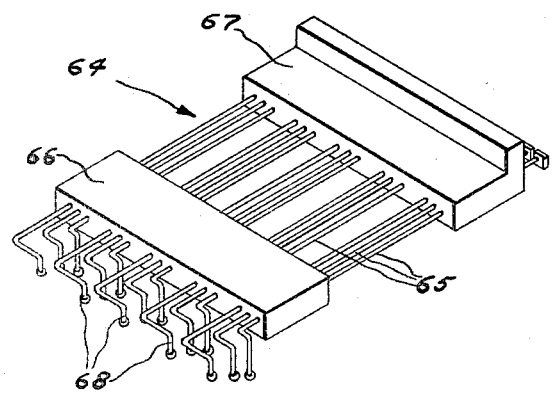
Fig. 4 is a perspective view of a wire comb of the type which is coated by use of the present invention.

Attention is now directed to Fig. 4 wherein is disclosed a typical wire spring relay comb designated generally by the reference number 64, which comprises a plurality of laterally-spaced wires 65 embedded in phenolic blocks 66 and 67. The wires 65 are provided with terminals extremities 68. It is these extremities which this invention has been designed to tin.

*Operation*

In order that a better understanding of the invention may be had, its operation during a typical cycle will now be described. The apparatus, as illustrated in Fig. 1, is at the start of a "tinning" cycle with the shaft 14 and the cams 21 and 37 rotating in the direction shown by the arrow. As the shaft 14 rotates through the arc *a* (Fig. 1), the cam follower 41 rides up and over the lobe 69 of the work feeding cam 37. This causes the bell crank 39 to oscillate about its pivot point and thereby effect a reciprocatory movement of feed bar 42. As the feed bar 42 moves to the right (Fig. 2), the feed pawls 47 rotate clockwise and slide over the wires 65. Prior to the return stroke of the feed bar 42, the feed pawls 47 drop to the positions shown in Fig. 2 and when the feed bar then moves to the left, the feed pawls engage the wires 65 and index the wire combs 64 to the next position to the left. Feed bar 42 is cut away at 70 to form pawl carrying projections 71 that are adapted to enter into the space between the open jaws 29 and 30. The clamping portion of the jaw 29 is of the same cross-section as the feed track 49 to permit the wire combs to slide from the feed track to the jaw and onto the feed track again. Since the remainder of the cam 37 is of uniform radius, the feed bar remains motionless for the remainder of the cycle.

As the shaft 14 rotates through the arc *b*, the cam follower 20 is forced to the right (Fig. 1) due to the increasing radius of the cam 21. This causes counterclockwise rotation of the rocker arm 19. Just after this movement has started, cam follower 32 is released from the influence of jaw opening cam 35. This permits the compression spring 34 to rotate clamping jaw 30 toward clamping jaw 29; thus gripping the wire comb 64 therebetween. Continued rotation of the rocker arm 19 carries the clamping jaws 29 and 30 and the wire comb toward the crucible 50. As the clamping jaws and work piece approach the solder crucible, a roller 72 on the jaw 30 engages a vertical portion 74 of the scraper slide 52 and causes the slide to start moving to the left (Fig. 3) against the urging of tension spring 53. Simultaneous with the movement of the rocker arm 19, the dipper 22 moves from the submerged position, indicated by dotted lines (Fig. 3), to the tinning position, indicated by solid lines. The dipper 22 arrives at this position just as the scraper slide 52 is positioned in register therewith, consequently the remainder of the movement of the slide 52 to the left causes the dross scraper 51 to scrape the dross from the top of the pool and leave a surface of unoxidized solder exposed. When the shaft 14 reaches the end of the arc *b*, the rocker arm 19 has reached its maximum left position and the terminal extremities 68 are submerged in the pool of solder within the dipper 22, as indicated by dotted lines in Fig. 3. The solder, of course, is maintained in a molten state by the application of heat to the crucible 50 from any suitable heat source. The shaft 14 continues to rotate, through the arc *c*, without any movement of the rocker arm 19 due to the uniform radius of the cam 21 throughout this arc. This leaves the terminal extremities motionless in the solder for a short period of time to insure thorough "tinning."

When the shaft 14 moves through the arc *d*, the cam follower 20 rolls down the incline created by the diminishing radius of the cam 21 and thus permits a small clockwise movement of the rocker arm 19. When this portion of the rotative movement is completed, the clamping jaws 29 and 30, with the work piece therebetween, are in the position illustrated by solid lines in Fig. 3. As the cam follower 20 is rolling along the periphery of the sector defined by the arc *e*, the clamping jaws remain in the position shown in Fig. 3 due to the constant radius of this sector. When the cam follower 20 is approximately midway between the extremities of the arc *e*, a small wedge-shaped projection 75 on the cam 21 pushes against a roller 76 on the micro-switch 63 and thereby closes the normally open contacts of the switch. This permits the source of electrical potential 62 to energize the solenoid 56 and thereby cause a rapid downward movement of the plunger 59 within the fixed bushing 60. At the end of its downward stroke, the plunger strikes sharply against the top of the clamping jaw 30 as illustrated in Fig. 3. This action causes a vibration of the terminal extremities 68 and thereby causes the excess solder to be shaken from the terminal extremities and permitted to fall back within the confines of the crucible. When the wedge-shaped projection 75 clears the micro-switch roller 76, the switch contacts again open thereby de-energizing the solenoid 56 and permitting the tension spring 61 to retract the plunger 59 to its upper position.

As the shaft continues to rotate, the fall in the periphery of the cam 21 defined by the arc *f*, permits the rocker arm 19 to rotate clockwise toward the starting position. Just before the motion of the rocker arm 19 is stopped by set screw 25, the cam follower 32 engages the jaw opening cam 35 and is slightly depressed thereby. This causes the forward extremity of the movable jaw 30 to pivot away from the work piece into the work releasing position shown in Fig. 1. The work piece 64 is then free to be indexed along the feed track 49 by the feed bar 42 and feed pawls 47 when the next cycle is initiated.

It is to be understood that although the coating apparatus herein described is utilized to coat the terminal extremities of wire spring relay combs, its utility is not limited thereto. It is manifest that the aforedescribed apparatus is simply illustrative of an application of the principles of the invention and that numerous modifications of the apparatus and elemental parts may be made without departing from the invention.

What is claimed is:

1. An apparatus for coating work pieces comprising a container for a coating composition, means for holding a work piece, means for feeding work pieces to said holding means, drive means for operating said feed means and for moving said holding means to dip the work piece being held into the coating composition, and means actuated by said drive means for vibrating said holding means to remove excess coating material from the work piece after the work piece has emerged from the coating composition.

2. An apparatus for coating work pieces with a fusible metal comprising a crucible for containing molten fusible metal, means for holding a work piece, means for feeding work pieces to said holding means, drive means for operating said feed means and for moving said holding means to dip the work piece into the molten metal, and means actuated by removal of said work piece from the molten metal by said drive means for striking said holding means to jar the work piece and thereby remove any excess molten metal from the work piece being held.

3. An apparatus for coating work pieces with a fusible metal comprising a heated container for confining molten fusible metal therein, clamping means for holding a work piece to be coated, indexing means for successively feeding work pieces to said clamping means, drive means for actuating said indexing means and for moving said clamping means to dip the work piece being held in the molten metal, and electrical means including a plunger actuated by said drive means, said plunger striking said clamping means after the work piece emerges from the molten metal to jar the work piece and thereby remove any excess metal clinging to the work piece.

4. An apparatus for coating wire spring relay combs with a fusible metal comprising a base, a heated crucible for confining molten fusible metal, clamping means pivotally mounted on said base for holding a work piece, feed means for successively feeding work pieces to said clamping means, drive means for indexing said feed means and for oscillating said clamping means to dip the work piece being held in the molten metal, means operated by the movement of said clamping means as the work piece approaches the crucible for scraping oxidized material from the surface of the molten metal, and an electrically actuated plunger operated by said drive means for jarring said clamping means after the work piece is extracted from the molten metal to vibrate the work piece whereby the excess molten metal is removed from the work piece.

5. An apparatus for coating the terminal extremities of wire spring relay combs with a fusible metal comprising a base, a heated crucible for containing molten fusible metal, a pair of work holding jaws pivotally mounted on said base, an indexing feed mechanism secured to said base for successively feeding work pieces to said work holding jaws, drive means for indexing said feed mechanism and for oscillating the work holding jaws in timed relationship therewith to dip the work piece being held in the molten metal, scraping means operated by the movement of the work holding jaws as the work piece held within the jaws approaches the crucible for removing oxidized material from the surface of the molten metal, and an electrically operated plunger actuated by said drive means for striking the work holding jaws after the work piece is withdrawn from the molten metal to vibrate the work piece and thereby remove any excess metal clinging to the work piece.

6. An apparatus for coating the terminal extremities of wire spring relay combs with a fusible metal comprising a base, a heated crucible for containing molten fusible metal, a trackway for receiving articles to be coated, a first article holding jaw pivotally mounted on said base in register with said trackway and as a continuation thereof, a second article holding jaw pivotally secured to said first jaw, means for urging said second jaw into clamping engagement with an article, means for holding said second jaw against the effect of said urging means, an indexing feed mechanism secured to said base for successively feeding articles along said trackway to said holding jaws, drive means for indexing said feed mechanism, means operated by said drive means for rendering said urging means effective and oscillating the article holding jaws in timed relationship to the indexing of said feed mechanism to dip the work piece being held in the molten metal, dross scraping means operated by the movement of the article holding jaws as the article held within the jaws approaches the crucible for removing oxidized material from the surface of the molten metal, and an electrically operated plunger actuated by said drive means for striking the article holding jaws after the article is withdrawn from the molten metal to vibrate the article and thereby remove any excess molten metal clinging to the article.

References Cited in the file of this patent

UNITED STATES PATENTS

| | | |
|---|---|---|
| 928,172 | Bernardin | July 13, 1909 |
| 2,204,775 | Schappi | June 18, 1940 |
| 2,267,273 | Garbe | Dec. 23, 1941 |
| 2,537,931 | Jenne | Jan. 9, 1951 |
| 2,751,311 | Rosseau | June 19, 1956 |
| 2,857,878 | Matson et al. | Oct. 28, 1958 |